United States Patent [19]

Rudolph

[11] Patent Number: 5,681,013
[45] Date of Patent: Oct. 28, 1997

[54] VORTEX LEADING EDGE FLAP ASSEMBLY FOR SUPERSONIC AIRPLANES

[75] Inventor: Peter K. C. Rudolph, Seattle, Wash.

[73] Assignee: The Boeing Company, Seattle, Wash.

[21] Appl. No.: 577,966

[22] Filed: Dec. 26, 1995

[51] Int. Cl.$^6$ ................................. B64C 3/50
[52] U.S. Cl. .................. 244/214; 244/218; 244/219
[58] Field of Search ........................ 244/214, 215, 244/218, 219, 211, 212

[56] References Cited

U.S. PATENT DOCUMENTS

| | | |
|---|---|---|
| 2,938,680 | 7/1960 | Greene et al. . |
| 3,272,458 | 9/1966 | Bracka . |
| 4,202,519 | 5/1980 | Fletcher . |
| 4,293,110 | 10/1981 | Middleton et al. . |
| 4,360,176 | 11/1982 | Brown . |
| 4,361,299 | 11/1982 | Sharrock ........................ 244/219 |
| 4,399,970 | 8/1983 | Evans . |
| 4,427,168 | 1/1984 | McKinney et al. ............. 244/219 |
| 4,437,631 | 3/1984 | Martens et al. . |
| 4,687,162 | 8/1987 | Johnson et al. ................ 244/214 |
| 4,895,323 | 1/1990 | May . |

Primary Examiner—Andres Kashnikow
Assistant Examiner—Tien Dinh
Attorney, Agent, or Firm—Christensen, O'Connor, Johnson & Kindness PLLC

[57] ABSTRACT

A leading edge flap (16) for supersonic transport airplanes is disclosed. In its stowed position, the leading edge flap forms the lower surface of the wing leading edge up to the horizontal center of the leading edge radius. For low speed operation, the vortex leading edge flap moves forward and rotates down. The upward curve of the flap leading edge triggers flow separation on the flap and rotational flow on the upper surface of the flap (vortex). The rounded shape of the upper fixed leading edge provides the conditions for a controlled reattachment of the flow on the upper wing surface and therefore a stable vortex. The vortex generates lift and a nose-up pitching moment. This improves maximum lift at low speed, reduces attitude for a given lift coefficient and improves lift to drag ratio. The mechanism (27) to move the vortex flap consists of two spanwise supports (24) with two diverging straight tracks (64 and 68) each and a screw drive mechanism (62) in the center of the flap panel (29). The flap motion is essentially normal to the airloads and therefore requires only low actuation forces.

15 Claims, 9 Drawing Sheets

VORTEX LEADING EDGE FLAP ASSEMBLY FOR SUPERSONIC AIRPLANES

The invention described herein was made in the performance of work under NASA Contract No. NAS1-19360 and is subject to the provisions of Section 305 of the National Aeronautics and Space Act of 1958 (42 U.S.C. 2457).

FIELD OF THE INVENTION

The present invention relates to flaps for aircraft, and more particularly to leading edge flaps for supersonic aircraft.

BACKGROUND OF THE INVENTION

Supersonic airplanes are subject to competing design goals. One goal is providing an airplane that cruises efficiently at supersonic speeds. This goal requires minimizing fuel consumption and airplane drag at supersonic cruise speeds. To achieve this goal, the wings of supersonic airplanes have a substantial rearward sweep, i.e., the wings are highly swept towards the tail of the aircraft. The high sweeping of the wings minimizes drag by maintaining a substantial portion of the leading edge of the wings inside the Mach cone at the maximum cruise Mach number of the airplane, which makes the airflow over a substantial portion of the wings subsonic. This allows the leading edge of the highly swept portion of the wings to be rounded.

The efficiency of supersonic airplanes at cruise speeds is further increased by providing supersonic airplanes with wings that generally have short spans, and small aspect ratios. The lift coefficient produced by such wings is low for a given angle of attack. While low, the lift coefficient is adequate at cruise because supersonic aircraft cruise at such high speeds that only a relatively small lift coefficient is required to generate sufficient cruise lift.

Unfortunately, swept wings having short spans and small aspect ratios adversely impact another design goal, namely low speed landing approach, landing and takeoff. Low speeds at landing approach, landing and takeoff are desired in order to minimize runway length requirements and to enhance safety. In order to generate a sufficient lift component at low speeds, supersonic aircraft must fly at a high angle of attack. Flying an airplane at a high angle of attack has several disadvantages.

First, there are geometrical/orientation disadvantages. High angles of attack make it difficult for pilots to see over the nose of the airplane in the direction of travel. Additionally, high angles of attack require long landing gear to ensure that the tail of the airplane clears the ground when landing or taking off.

Second, there are drag and engine power setting disadvantages. High angles of attack create high drag, requiring the engines to be operated at high power levels. This reduces airplane take-off weight for a given engine size and hence payload/range potential. High engine power settings also increase fuel consumption, as well as engine and jet noise. The noise increase occurs during take off and landing. It occurs when a supersonic airplane is near an airport and at low altitude, resulting in an adverse impact on the surrounding community.

Finally, there are control disadvantages. At high angles of attack, a vortex develops on the upper surface of the inboard wing leading edges of supersonic airplanes. The vortex is generally not stable, it fluctuates in size, chord-wise location, and span-wise peal-off point. Moreover, the fluctuations are often not symmetrical from one wing to the other. The instability of the vortices cause a bumpy ride and the asymmetry of the vortices create control problems.

One way of increasing wing lift and, thus, reducing the angle of attack of an airplane at low speeds is to increase the effective wing chord length and/or wing camber. This is normally accomplished using leading and trailing edge flaps.

Various proposals have been made to use leading edge flaps to intentionally create a stable vortex on the wings of a supersonic airplane flying at low speeds in order to reduce control and attitude problems. One such proposal suggests using a hinged leading edge flap capable of downward and upward deflections. During attached flow conditions at lower angles of attack, the flap deflects downward for increased generation of lift at low speeds. At greater angles of attack, where there is a significant risk of forming a vortex, the flap deflects upward, creating a large discrepancy between the inflow angle and the flap leading edge that intentionally triggers a vortex.

There are two problems with the foregoing proposal. First, the flap does not define an aft boundary for the vortex. Hence, the size and location of the vortex on the wing fluctuates, i.e., becomes unstable, which adversely affects the control and ride quality of the aircraft. Second, when the flap changes from a downward deflection to an upward deflection, a significant loss of lift occurs. Although the loss of lift is temporary, it creates a hazard. The hazard is particularly troublesome because flap changes and, thus, loss of lift are most likely to occur when an aircraft is flying close to the ground, such as following takeoff, or shortly before touching down.

Another proposal suggests using a leading edge spoiler, also called a vortex fence. The leading edge spoiler comprises a flap that rotates up from the top surface of the wing to a position transverse to the oncoming airflow, triggering a vortex behind the flap. Because leading edge spoilers create high drag, they are generally not usable during most phases of a flight. Leading edge spoilers are normally used to generate a nose-up pitching moment during takeoff rotation and landing flare.

Yet another proposal is to provide a leading edge flap that rotates downward and forward from the lower surface of the wing. Such flaps are known as Krueger flaps. Krueger flaps first rotate through a position transverse to the oncoming airflow. After the transverse position, the flaps continue to rotate until the distal edge of the flaps are directed diagonally downward and forward relative to the leading edge of the wing. There are two problems with this proposal. First, the flap is required to rotate through a large angle, typically around 140°. This is difficult to mechanize even on the relatively thick wings incorporated in subsonic airplanes. It is especially difficult or even impossible to mechanize in the relatively thin wings incorporated in supersonic airplanes. Second, because the flaps rotate transverse to the oncoming airflow, they require a drive system capable of producing very high actuation forces.

The present invention is directed to overcoming the foregoing, and other problems associated with the use of leading edge flaps on supersonic airplane wings to increase lift at low speeds.

SUMMARY OF THE INVENTION

In accordance with the present invention, vortex flaps for a supersonic airplane wing are provided. The vortex flaps are ideally suited for use on the rounded leading edge of the inboard strake and the midspan section of a double delta wing. It is not designed for use on the outboard section of such a wing because the leading edge sweep is too low (<55°) for formation of a leading edge vortex and the sharp leading edge is too thin to accommodate the flap. On an arrow type wing having an entire leading edge that is rounded and a uniform sweep of greater than 55°, the vortex flap could be used from wing root to tip.

In accordance with further aspects of this invention, the vortex flaps are formed by leading edge vortex flap assemblies that each include an upper fixed leading edge panel having one end (the trailing end) affixed to the forward spar of the airplane wing. The exterior upper surface of the trailing end of the leading edge panel is faired into the upper wing skin. The other or forward end of the exterior upper surface of the leading edge panel curves convexly downward to form a downwardly curved forward edge.

Each leading edge vortex flap assembly also includes a flap panel associated with each fixed leading edge. The flap panel is movable between extended and retracted positions relative to the fixed leading edge panel. One end of the exterior lower surface of the flap panel curves convexly upward to form an upwardly curved forward edge. In the retracted position, the forward edge of the flap panel is adjacent the forward edge of the fixed leading edge panel. More particularly, in the retracted position, the forward edge of the flap panels is in substantial tangential alignment with the forward edge of the fixed leading edge panel. The tangential alignment is such that the leading edge of a supersonic airplane wing incorporating the leading edge flap assembly is rounded. In the extended position, the forward edge of the flap panels is located forward and below the forward edge of the fixed leading edge panel.

An actuation mechanism associated with each flap panel connects the flap panel to the leading edge panel for that vortex flap assembly, and moves the flap panel relative to the leading edge. Specifically, the actuation mechanism moves the flap panel between the retracted and extended positions. Flap panel movement is translatory and rotational. During extension, the forward edge of the flap panel moves away from the forward edge of the leading edge panel in the forward and downward direction. During retraction, the forward edge of the flap panel returns to a position adjacent to the leading edge panel.

In accordance with other aspects of this invention, the leading edge vortex flap assemblies include two support ribs per flap panel. The support ribs are located inwardly from the flap panel edges by a distance equal to approximately 25% of flap span away from the flap panel edges. The support ribs are affixed to the forward spar of the wing. The support ribs provide support for the fixed leading edge panel as well as the flap actuation mechanism.

In accordance with yet other aspects of this invention, each of the actuation mechanisms include two generally straight guide tracks, one affixed to each of the support ribs. The guide tracks guide the movement of the associated flap panel, when the flap panel is moved relative to the leading edge panel.

In accordance with still other aspects of this invention, each of the actuation mechanisms also include a second set of two generally straight guide tracks affixed to the flap panel. This second set of guide tracks also guide the movement of the associated flap panel.

In accordance with yet other aspects of this invention, each actuation mechanism includes a drive mechanism for moving the associated flap panel between its extended and retracted positions.

As will be readily appreciated from the foregoing description, the invention provides new and improved leading edge vortex flap assemblies that are ideally suited for use in a supersonic airplane wing. The upward curve of the leading edge of the deployed flap panel guarantees that flow separation occurs at this location, providing an upstream boundary for a leading edge vortex that is created when the flaps are extended. The rounded forward end of the leading edge panel sets the downstream boundary of the leading edge vortex and controls reattachment of the flow to the upper wing surface, or the downstream boundary for the vortex. The vortex rotates counter-clockwise with the flow going upstream on the flap upper surface and downstream at the upper open boundary. Because the forward and aft boundaries of the vortex are clearly defined, the vortex is stable. The use of the double-track mechanism provides strong support without the need for high actuation forces. No temporary high drag and/or lift loss occurs as flap panels formed in accordance with the invention are extended because the forward edges of the flap panels move forward and down, rather than rotating through an arc. These results are accomplished within the limited confines of the support structure of the relatively thin wings of supersonic airplanes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
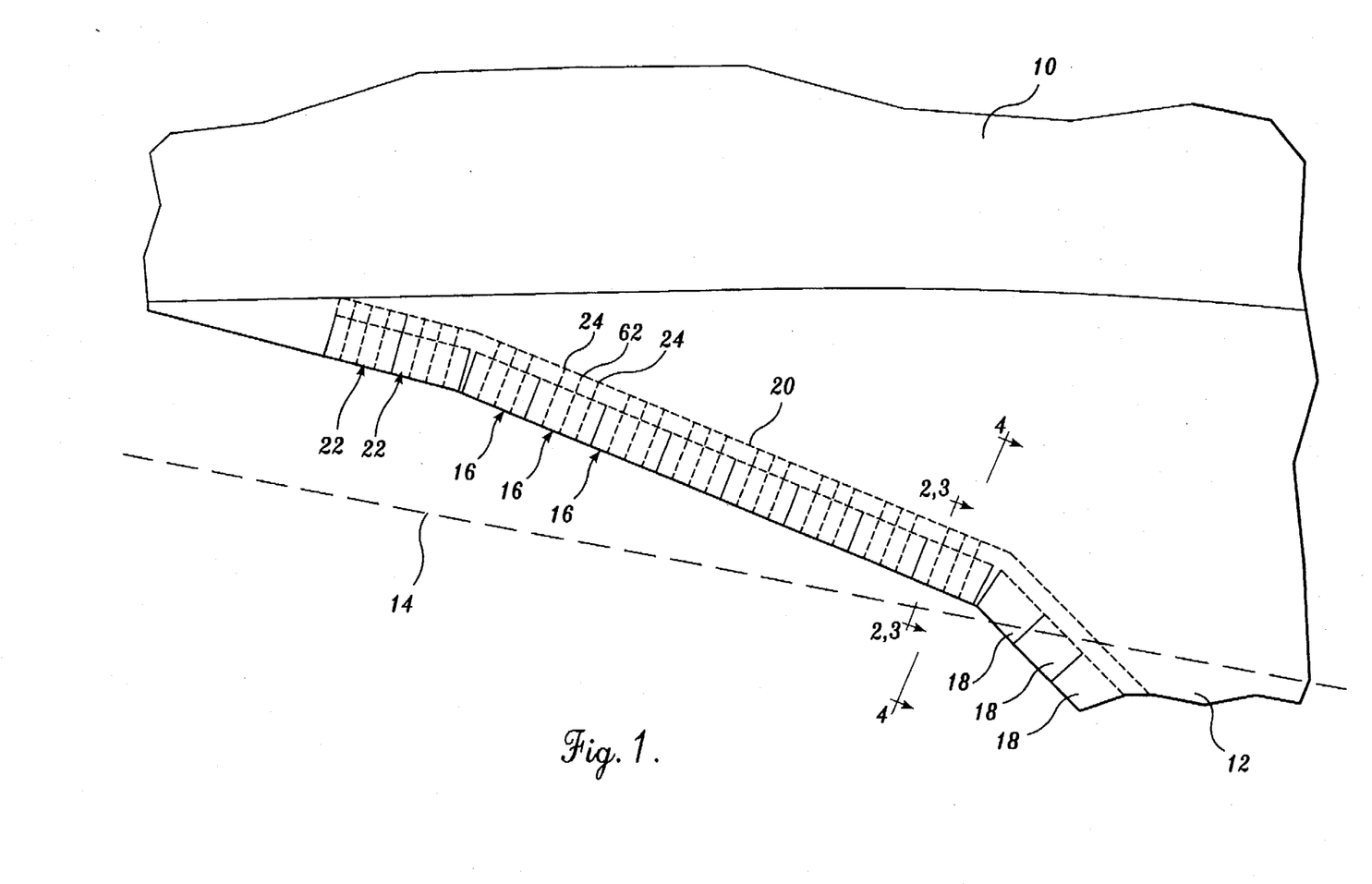
FIG. 1 is top plan view of a portion of an airplane fuselage and wing incorporating leading edge vortex flap assemblies formed in accordance with the present invention.

FIG. 1 illustrates a portion of a fuselage 10 of an airplane designed to cruise at supersonic speeds. FIG. 1 also illustrates a portion of a wing 12 extending from the fuselage of the airplane. When the airplane cruises at supersonic speed, a Mach cone, indicated by dotted line 14, coaxially envelopes the airplane. The apex of the cone is located near the nose of the airplane. The wing 12 is highly swept rearwardly. As a result, the inboard portion of the wing is retained inside the Mach cone at the airplane's maximum cruise Mach number, while the outboard portion of the wing, which extends past dotted line 14, lies outside of the Mach cone. The illustrated wing has three sections whose sweep angles decrease in the outboard direction. That is, the inboard section is the most highly swept, having a sweep angle of approximately 75°; the midsection is the next most highly swept, having a sweep angle of approximately 68°; and the outboard section is the least highly swept, having a sweep angle of approximately 48°. The angle of sweep of each section of the wing 12 is measured relative to a line lying perpendicular to the longitudinal centerline of the airplane. As shown, the inboard and midsections lie inside of the Mach cone and the outboard section lies outside the Mach cone.

As described below, leading edge vortex flap assemblies 16 and 22, formed in accordance with the present invention, are located in the portion of the wing 12 positioned inside the Mach cone 14, i.e., in the inboard and mid span sections of the wing. Airflow around the portion of the wing 12 inside the Mach cone 14 is subsonic, while airflow around the portion of the wing outside the Mach cone is supersonic. For more efficient generation of lift, the portion of the wing 12 inside the Mach cone 12 is thicker relative to the portion of the wing outside the Mach cone and has a rounded (subsonic) leading edge. Because the portion of the wing 12 inside the Mach cone 12 is thicker, this portion of the wing can provide greater structural support for leading edge vortex flap assemblies than the thinner portion of the wing outside of the Mach cone. Conventional leading edge flap assemblies 18, such as hinged leading edge flaps, may be connected to the outboard portion of the wing 12 where the leading edge is sharp and the sweep is insufficient to produce a stable leading edge vortex.

Leading edge vortex flap assemblies formed in accordance with this invention include inboard leading edge vortex flap assemblies 22 and midspan vortex flap assemblies 16. The inboard vortex flap assemblies 22 are attached to the section of the wing 12 having the greatest angle of sweep, i.e., the inboard section. The midspan vortex flap assemblies 16 are attached to the midsection of the wing. The inboard vortex flap assemblies 22 are substantially identical to the midspan vortex flap assemblies 16. The main difference is that the inboard vortex flap assemblies 22, because they are located over a longer chord airfoil with higher thickness ratio, are thicker than the midspan vortex flap assemblies 16. The midspan vortex flap 16 assemblies are tapered in thickness, with the thinnest section located at the outboard end. The sections shown in the drawings are taken at the most outboard end of the midspan vortex flap assemblies 16 and show the most critical section for structural support and space available.

As shown in FIG. 1, each vortex flap assembly 16 and 22 includes a pair of internal spaced-apart ribs 24 connected to the forward spar 20 of the wing 12. Each pair of ribs 24 extend generally perpendicularly from the forward spar 20 and provide support for the vortex flap assemblies 16 and 22. The ribs are located inwardly from the transverse edges of the associated flap assembly by a distance equal to approximately 25% of the width of the flap assembly.

Figure 2:
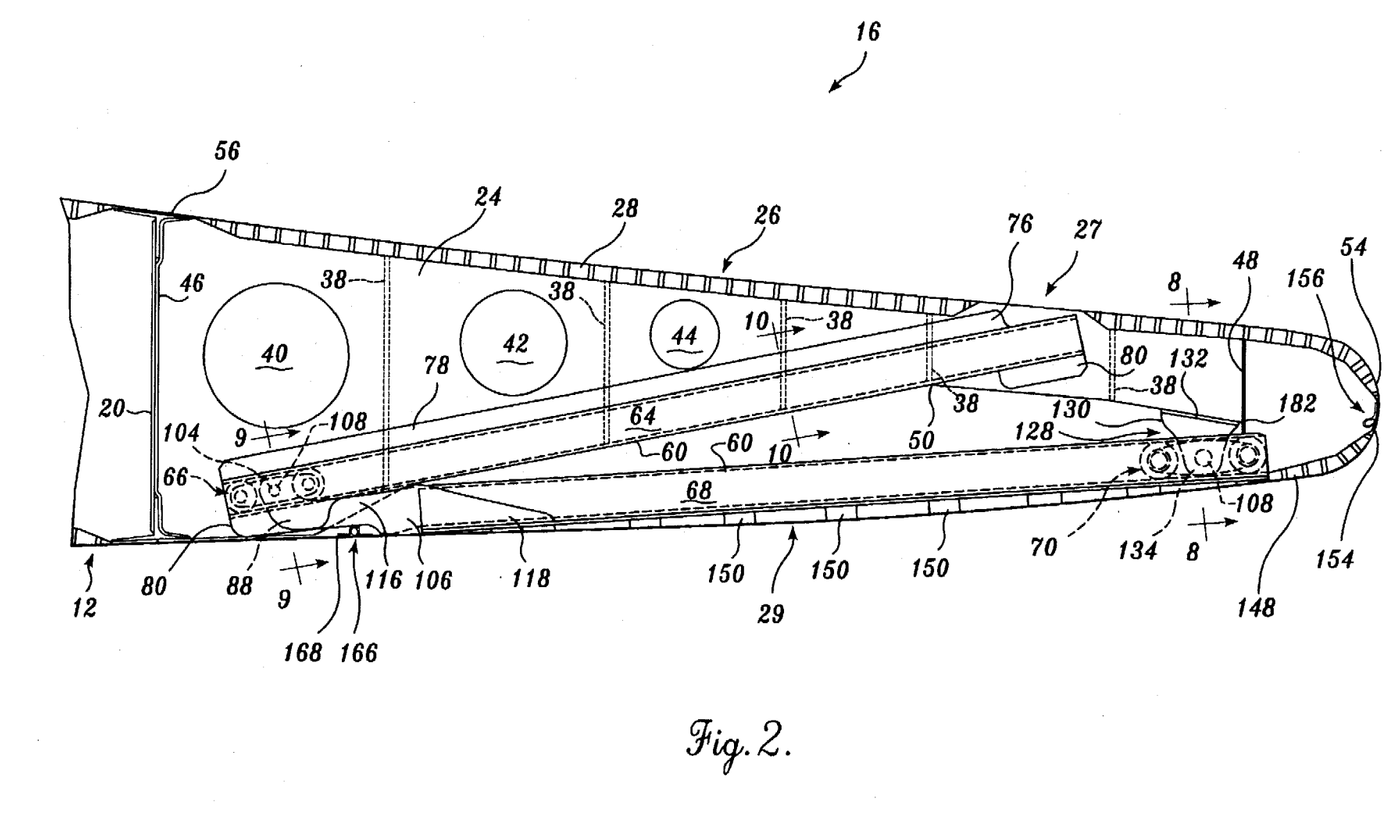
FIG. 2 is a cross-sectional view along section line 2—2 of FIG. 1 showing the inboard support location of the most outboard midspan vortex flap of a flap panel of a leading edge vortex flap assembly with the flap panel in the stowed position.
Figure 3:
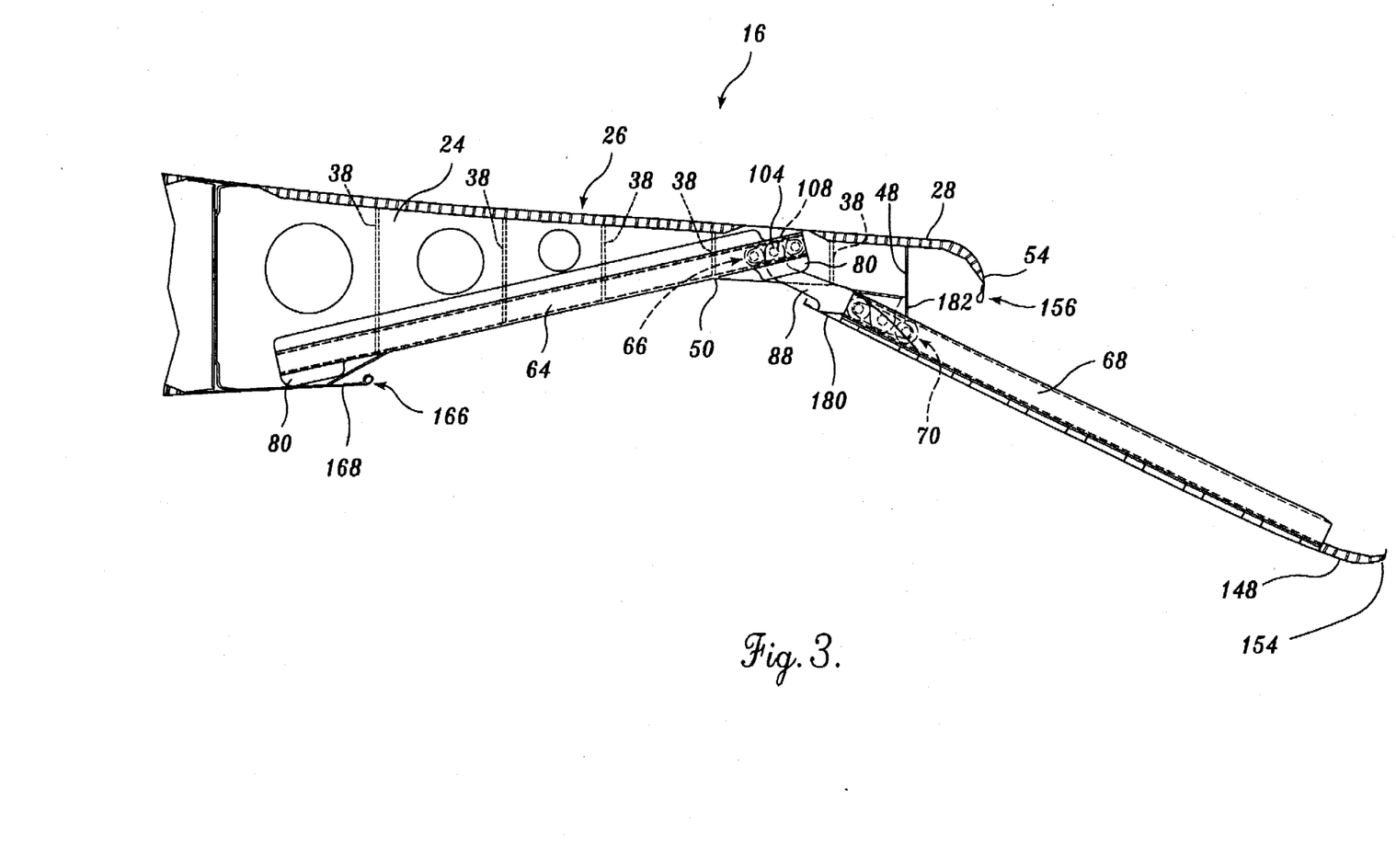
FIG. 3 is a cross-sectional view along section line 3—3 of FIG. 1 showing the inboard support location of the most outboard midspan vortex flap of a flap panel of a leading edge vortex flap assembly with the flap panel in the extended position.

Referring to FIGS. 2 and 3, each vortex flap assembly 16 includes a leading edge panel 26, an actuation mechanism 27, a flap panel 29, and a plurality of seals. The leading edge panel 26 is affixed to and supported by the ribs 24 in the manner hereinafter described. The actuation mechanism 27 connects the flap panel 29 to the leading edge panel 26, and as will be described in more detail later, moves the flap panel 29 relative to the leading edge panel 26 as shown in FIG. 3. Unless otherwise indicated, the components of the herein described vortex flap assemblies 16 and 22 are manufactured from materials conventionally used to make aircraft structures, such as light-weight, high-strength metal alloys, or composite materials. The chosen materials must be compatible with the stagnation temperatures associated with supersonic flight at Math 2 to 2.4 (250° to 360° F.). Also, the external flow surfaces have to meet rain and hail erosion resistance criteria.

Figure 8:
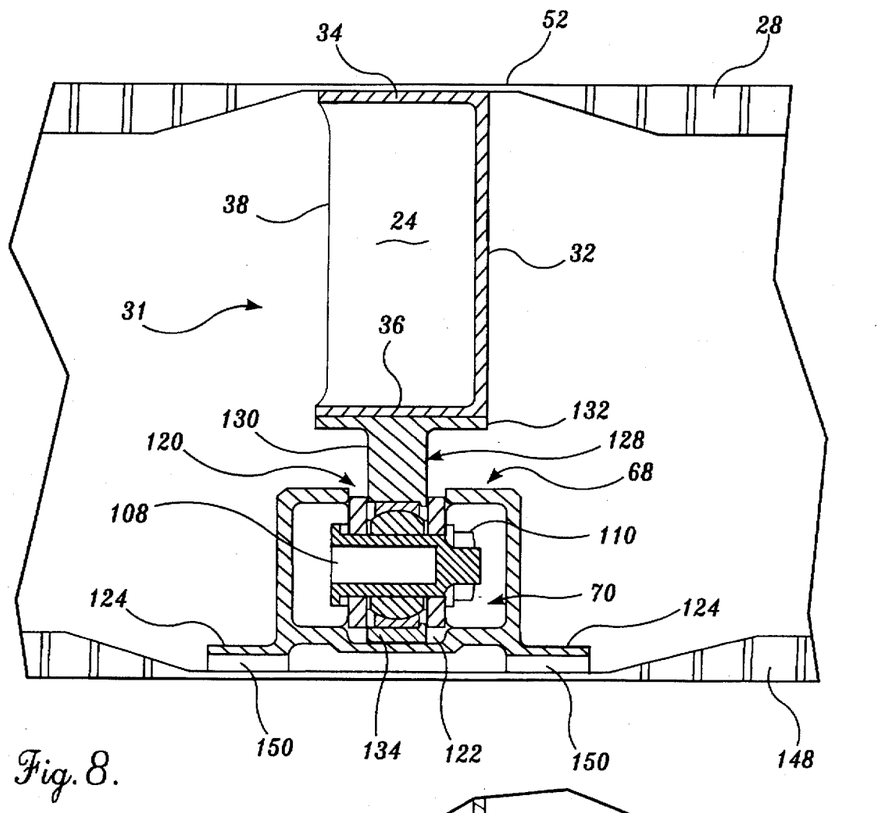
FIG. 8 is a cross-sectional view along section line 8—8 of FIG. 2.
Figure 9:
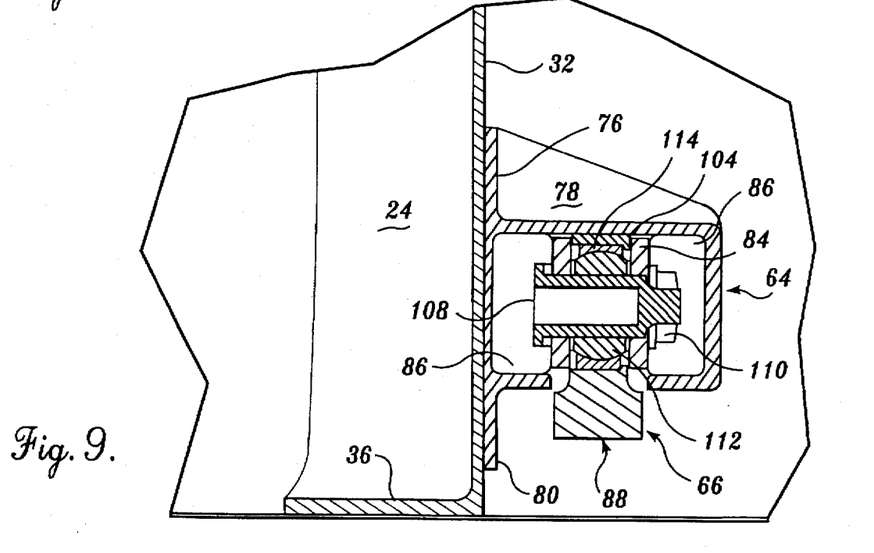
FIG. 9 is a cross-sectional view along section line 9—9 of FIG. 2.
Figure 10:
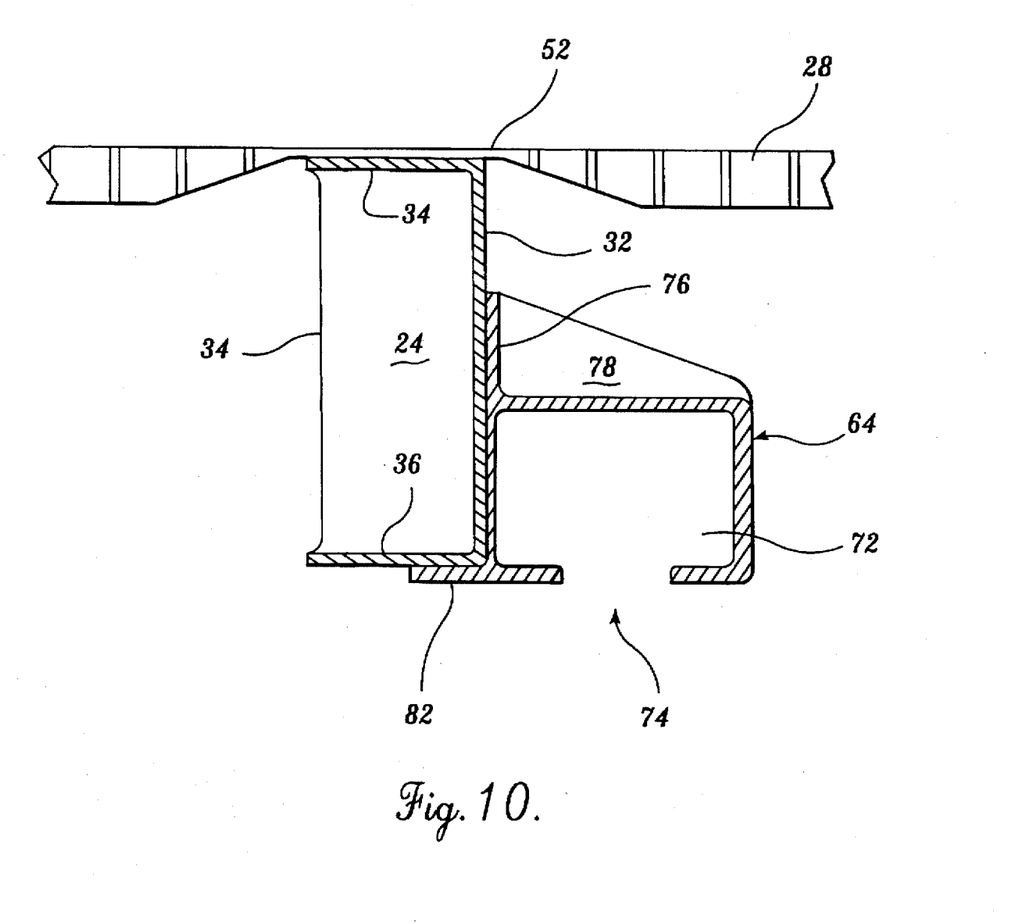
FIG. 10 is a cross-sectional view along section line 10—10 of FIG. 2.

The leading edge panel 26 of each flap assembly 16 includes the internal supporting ribs 24, and an outer skin 28 that defines the upper surface of the airfoil. As shown in FIGS. 8–10, each rib 24 is a C-shaped channel 31 that includes a vertical web 32 and upper and lower flanges 34 and 36. The ribs 24 are oriented such that the interior of the channels 31 of each pair of ribs face one another. Spaced-apart vertical cross members 38 divide the channel 31 into compartments (see FIGS. 2 and 3) that are generally trapezoidal in shape. The substantially circular apertures 40, 42, and 44 that pass through the vertical web 32 of the ribs 24 shown in FIG. 2 are included to reduce weight, and provide passageways for cables, wires, anti-icing ducts, power transmission members, and other items required to pass through the vortex flap assemblies. The aft ends 46 of the ribs 24 are connected to the forward spar 20 of the airplane wing, preferably by bolting the ribs to fittings installed on the forward face of the spar and the forward spar chords.

As best seen in FIG. 3, the height of the vertical web 32 (see FIGS. 8–10) of the ribs 24 is not constant. More particularly, the height of the vertical web 32 decreases in the direction towards the forward end 48 of the ribs 24 to a minimum at point 50. Point 50 is located more than one-half the distance from the aft end 46 to the forward end 48 of the ribs. Thereafter, the height of the vertical web 32 increases in the direction towards the forward end 48.

The ribs 24 support the outer skin 28 as shown in FIGS. 8 and 10. The outer skin 28 is a honeycomb core panel that includes a chamfered region 52 of narrower thickness where the skin 28 is connected to the upper flanges 34 of the ribs 24. More generally, chamfered regions are formed in the honeycomb core panels where the skin is connected to other structures. The preferred fastening method for attaching the skin 28 to the ribs 24 are penetration fasteners, such as rivets or bolts. The open periphery of the forward edge of the outer skin 28 is also chamfered to provide a panel close-out for sealing the honeycomb core and to form a surface for installation of a forward seal 156 (shown in FIG. 5) and described below.

Referring to FIG. 2, the exterior upper surface of the skin 28 of the leading edge panel 26 curves convexly downward to form a curved forward, distal edge 54. The trailing or aft edge of the skin 28 is chamfered down to a region 56 of narrower thickness for attachment to other structures. More particularly, the chamfered region 56 is bolted to the upper forward chord of the spar 20.

Figure 4:
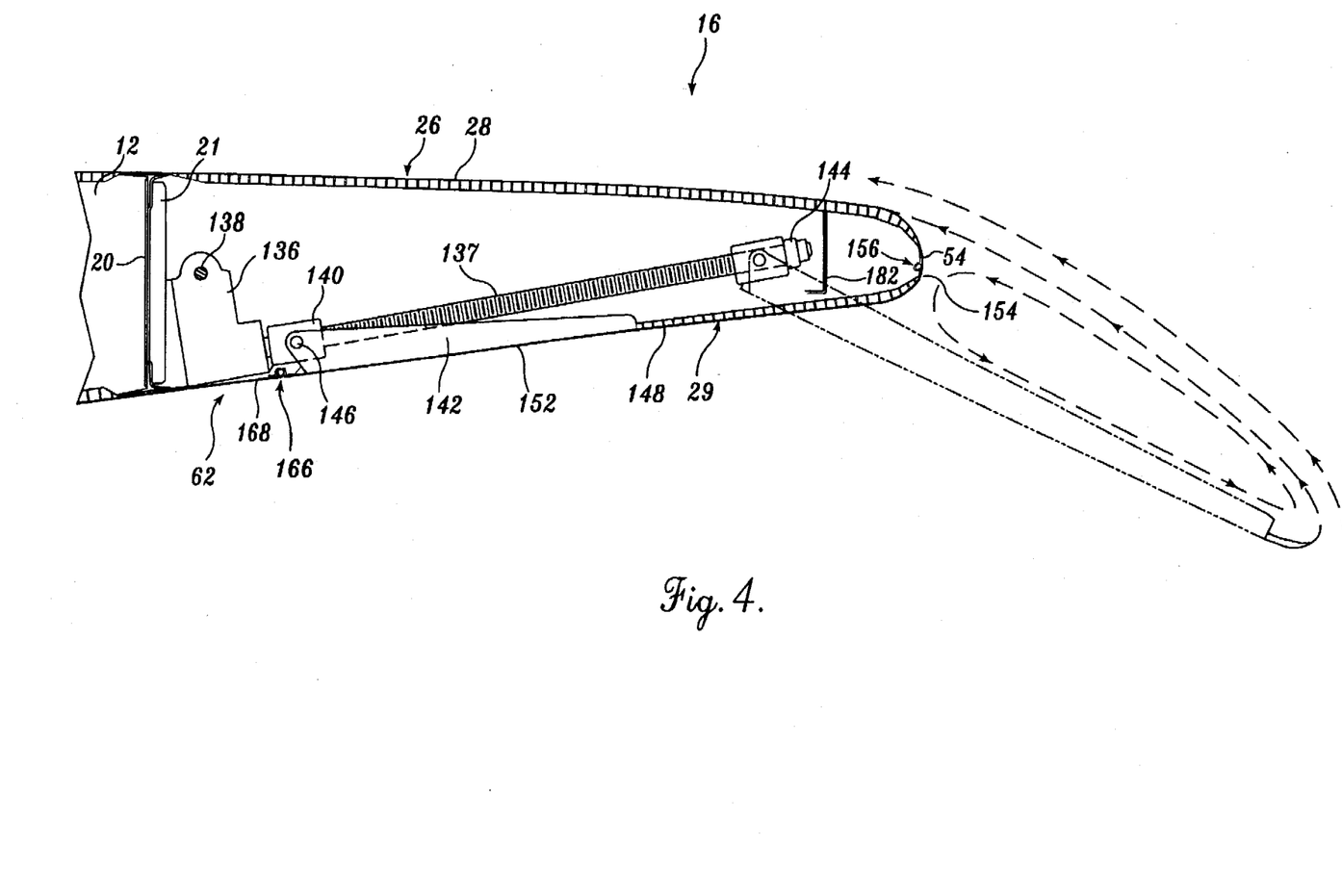
FIG. 4 is a cross-sectional view along section line 4—4 of FIG. 1 showing the flap drive mechanism of a leading edge vortex flap assembly in the retracted (solid lines) and the extended (phantom lines) positions.

The actuation mechanism 27 includes two pairs of tracks and a drive mechanism 62 (see FIGS. 2 and 4). The pairs of tracks are generally aligned with and affixed to the ribs 24. Thus, each pair of tracks is located about 25% inwardly from a transverse edge of the associated vortex flap assembly 16 or 22. The drive mechanism is located between the pairs of tracks, in the middle of each flap panel. The pairs of tracks guide the associated flap panels 29 as they are moved relative to the leading edge panel 26 by the drive mechanisms 62.

Each pair of tracks includes an upper track 64, a mobile carriage 66, a lower track 68, and a stationary carriage 70. The upper track 64 is straight and is mounted on the side of the web 32 of a related rib 24 as shown in FIGS. 9 and 10. As shown in FIG. 10, the upper track 64 has a generally rectangular channel 72 that includes an opening 74 directed downwardly towards the flap panel 29. The channel 72 and opening 74 extends along the length of the track 64. The aft end of the track 64 is attached to the rib 24, below the aperture 40 as shown in FIG. 2. The track 64 slopes upward and forward.

Referring to FIGS. 9 and 10, the upper track 64 includes an upper vertical flange 76. The upper vertical flange 76 is interposed against and affixed to web 32 of the rib 24. The upper track 64 also includes a plurality of spaced-apart, generally parallel gusset stiffeners 78 that extend between the upper flange 76 and the rectangular cross-sectionally shaped section 72. (For clarity of illustration, the gusset stiffeners are not shown in FIGS. 2 and 3).

With specific reference to FIG. 9, the ends of the upper track 64 each include an end flange 80 that is coplanar with the upper vertical flange 76. The end flanges 80 lie adjacent to the web 32 of the rib 24, and are attached thereto. The lower flanges 80 are also visible in FIGS. 2 and 3.

Referring to FIG. 10, a horizontal flange 82 extends outwardly from the upper track 64 in the region of the track that lies between the end flanges 80. The horizontal flange 82 lies generally perpendicular to the end flanges 80. The horizontal flange 82 lies underneath the associated rib 24, against the lower flange 36, and is attached thereto.

The stiffeners 78, and flanges 76, 80 and 82 are formed integrally with the upper track 64. The flanges 76, 80, and 82 are attached to the ribs 24 by fasteners (not shown) that penetrate through the flanges and adjacent surfaces of the ribs 24.

Figure 7:
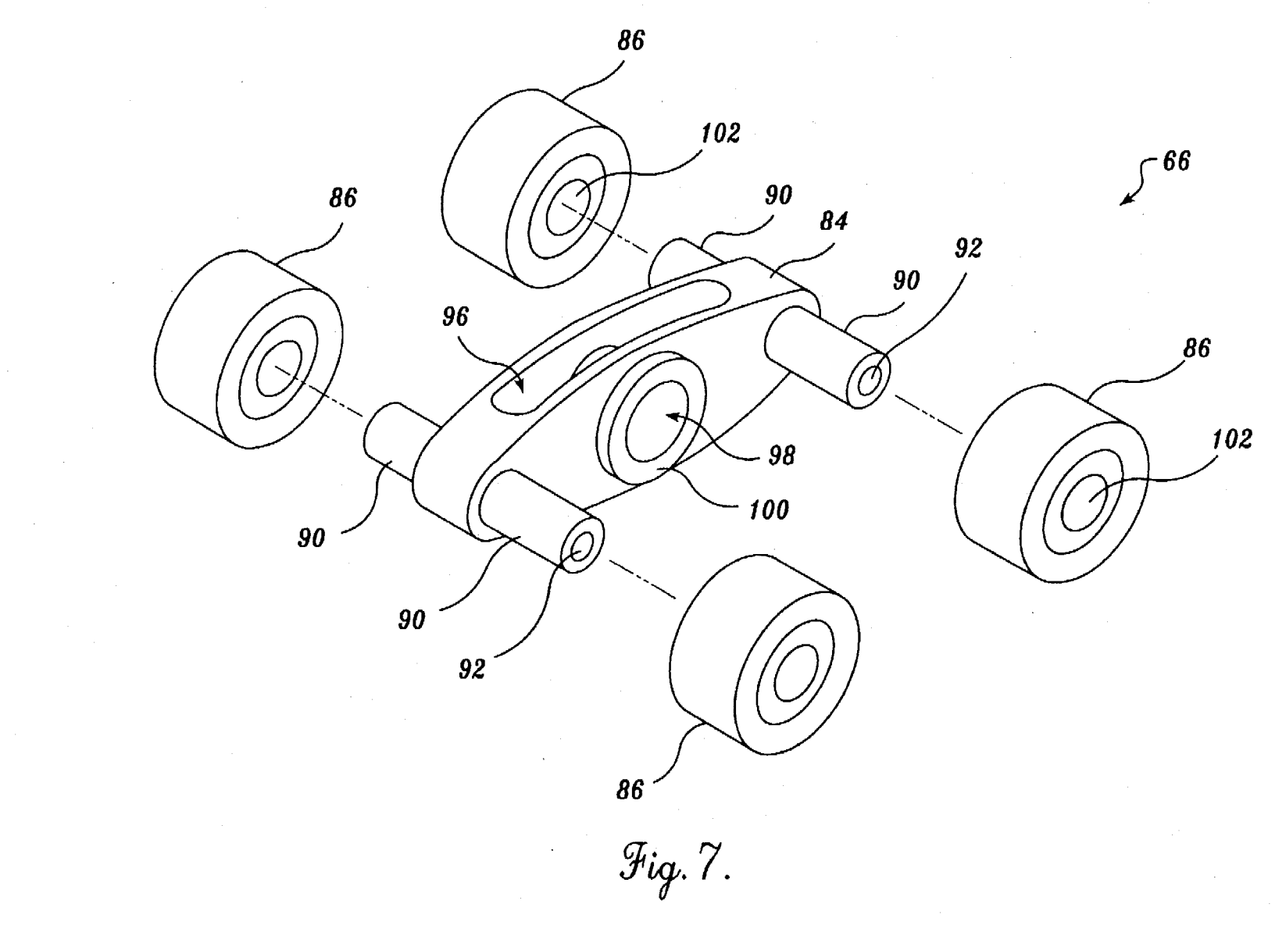
FIG. 7 is a perspective view of a portion of a carriage shown in FIGS. 2 and 3.

The mobile carriage 66 is mounted for movement inside the channel 72 of the upper track 64, as shown in FIGS. 2, 3, and 9. FIG. 7 is an exploded perspective view showing the major portions of the mobile carriage 66 removed from the upper track 64. The mobile carriage 66 includes a carriage body 84, four wheels 86, and an attach fitting 88. (For clarity of illustration, the attach fitting 88 is not shown in FIG. 7).

The carriage body 84 has the shape of an ellipse when viewed from the side. There is a vertical slot in the carriage body into which the attach fitting 88 is installed. Opposed pins 90 project from the flat sides of the carriage body 84 at the forward and aft ends thereof. The pins 90 have threaded end holes 92 for receiving retaining bolts (not shown) for rollers 86. More specifically, mounted on each of the pins 90 is a roller 86. The pins 90, which penetrate coaxially through each roller 86, serve as axles. That is, the rollers 86 are rotatable about the pins 90. Preferably, the rollers 86 include internal needle, or spherical bearings (not shown) to reduce friction. The provision of four rollers 90 provides for reduced forces upon the track 64. The rollers are held onto the pins by retaining bolts that are threaded into the ends of the pins.

The rollers 86 have a diameter approximately equal in height to the height of the channel 74 in the track 64 as shown in FIG. 9. Referring to FIG. 7, each roller 86 is coaxially mounted on a pin 90. More specifically, each roller 86 includes a central, cylindrical hole 102. The rollers 86 are retained on the pins 90 by bolts that are screwed into the bolt holes 92 in the pins 90.

A slot 96 is formed through the carriage body 84 between the pins 90. The slot lies orthogonal to the pins. Formed through the center of the carriage body 84, parallel to the pins 90, and thus perpendicular to the slot, is a cylindrical bore hole 98. A raised boss 100 projects perpendicularly from both sides of the carriage body 84 and coaxially surrounds the entrances to the bore hole 98.

With reference to FIG. 2, the attach fitting 88 includes an upwardly curved end 104, and a track connection end 106. The curved end 104 is installed in the slot 96 of the carriage body 84 (see FIG. 7). As shown in FIG. 9, the curved end 104 is rotatably attached to the carriage body 84 by a pivot pin 108 inserted through the bore holes 98 located on the sides of the carriage body 84 (see FIG. 7), and through a hole in the curved end 104 of the attach fitting 88. A nut 110 secured to the end of the pin 108 that is opposite the head of the pin retains the pin in the inserted position.

A mono-ball assembly comprising an inner race 112, and an outer race 114 is installed within the curved end 104 of the attach fitting 88 with a press or shrink fit. The inner race 112 and outer race 114 are preferably made from steel. The surfaces of the inner race 112 and outer race 114 are coated with a nonstick material, such as TEFLON, or are left bare metal using grease lubrication.

The foregoing mono-ball assembly permits the attach fitting 88 to pivot about the longitudinal axis of the pivot pin 108 with a low coefficient of friction. The mono-ball assembly also permits the pivot member 88 to rotate about an axis perpendicular to the longitudinal axis of the pivot pin 108 by a few degrees.

Referring to FIG. 2, the forward end 106 of the attach fitting 88 extends forward relative to the curved end 104 and is connected to the aft end of the flap panel 29 adjacent and parallel to the lower rail 68. More particularly, the forward end 106 includes a generally rectangularly-shaped U-channel 116 that extends from the solid curved end 104. The lower surface of the U-channel 116 is bolted to the aft end of the flap panel 29 using a local reinforcement plate (not shown).

The lower track 68 forms a channel having an opening 120 directed upwardly towards the rib 24 as shown in FIG. 8. The channel is generally rectangular in shape, except for groove 122 extending centrally along the bottom of the channel.

The exterior of the lower track 68 corresponds generally to the shape of the interior channel therein with one principal exception. Namely, a support foot 124 extends from each bottom corner of the lower track 68. Each foot 124 is generally rectangular in cross-section and extends away from the lower track 68, in a direction generally parallel to the lateral axis of the lower rail. Each foot 124 extends along the length of the lower track 68, and is located above the flap panel 29 as will be described later.

The stationary carriage 70 is positioned inside the channel of the lower track 68. The stationary carriage 70 is substantially identical to the previously described mobile carriage 66, with one major exception. Specifically, the stationary carriage 70 includes an attach fitting 128 different from the attach fitting 88 of the mobile carriage 66.

The attach fitting 128 of the stationary carriage 70 includes a main body portion 130, and two flanges 132. The flanges 132 are generally rectangular in shape and are disposed centrally above the main body portion 130 of the attach fitting 128. The flanges 132 of the attach fitting 128 are connected to the lower flange 36 of the rib 24 using penetration fasteners, preferably bolts.

The main body portion 130 of the attach fitting 128 is generally rectangular in cross-section. The main body portion 130 and the two flanges 132 are machined from one piece. The distal end of the main body portion 130 narrows to a rounded tip 134 as shown in FIG. 2.

Also as described in connection with the mobile carriage 66, a mono-ball assembly is installed in the tip 134 of the attach fitting 128 using a press or shrink fit as shown in FIG. 8. A pivot pin 108, secured by a nut 110, connects the stationary carriage to the attach fitting 128. The mono-ball assembly permits the stationary carriage 70 to pivot about the longitudinal axis of the pivot pin 108 with a low coefficient of friction. The mono-ball assembly also permits the pivot member 88 to rotate about an axis perpendicular to the longitudinal axis of the pivot pin 108 by a few degrees.

The drive mechanism 62 is located centrally between the ribs 24 in the middle of each flap assembly 16 as shown schematically in FIG. 1. Referring to FIG. 4, each drive mechanism 62 includes a right angle drive 136, a screw 137, a ball nut 140, and a connecting member 142. The right angle drive 136 is attached to the front spar 20 of the wing 12 through fittings 21 on the forward side of the spar using bolts.

The right angle drive 136 receives rotative power from a drive shaft 138. The drive shaft 133 extends generally parallel to the spar 20 and connects to the ball drive mechanism 62 of each flap assembly 16 and 22. Rotation of the drive shaft 138 is accomplished with a power drive unit (PDU) (not shown). The PDU may be located centrally between the flap assemblies 16 and 22, on the wing 12, or a PDU may be located centrally in the fuselage for driving vortex flap assemblies on both wings of an aircraft. The PDU generally consists of a gear box and a primary and secondary motor. The primary motor is preferably a hydraulic type, with the secondary motor being electric. Alternatively, both the primary and secondary motors may be hydraulic.

As noted previously, the wing 12 includes several different sections having different angles of sweep. This requires the drive shaft 138 to bend, or change its direction of travel when crossing from one wing section to another. To permit the drive shaft 138 to bend, the drive shaft includes angle drives with constant velocity joints (not shown), at locations where the drive rod passes from one wing section to another. The drive shaft 138 passes through the aft most aperture 40 (see FIG. 2) in the ribs 24.

A ball screw 137 cantilevers forwardly from the right angle drive 136, at an angle between the fixed leading edge panel 26 and the flap panel 29, with the screw being threaded centrally through the ball nut 140. As will be explained in more detail later, the distal end of the screw 137 includes a stop 144 that prevents the ball nut 140 from becoming disengaged from the screw 137.

The flap panel 29 hingedly attaches to the ball nut 140 by means of an attachment joint 146. When the flap panel 29 extends and retracts, this attachment joint 146 does not travel in a straight line, even though it is guided by two straight tracks 60. The fact that the attachment joint 146 does not travel in a straight line requires that the screw 137 be able to swivel by a few degrees. This is accomplished by a universal or homokinetic joint in side the angle drive 136 (not shown). The internal universal or homokinetic joint also accommodates flap deflections due to loads.

The connecting member 142 has a rectangular channel cross-section. The horizontal flange of the connecting member 142 is bolted to a reinforced chamfered area of the flap panel 29. (As discussed below, the flap panel 29 is formed from a honeycomb core panel). The aft end of the connecting member 142 straddles the ball nut 140 and is rotatably connected to the ball nut with two pins 146 on opposite sides of the ball nut.

As noted previously, the outer skin 148 of the flap panel 29 is formed from a honeycomb core panel. The outer skin 148 forms the flow surface or lower forward wing contour when the flap is stowed (see FIG. 2). The honeycomb core panel forming the skin 148 of the flap panel 29 includes several chamfered areas. The forward, aft and two side edges are chamfered to form a solid edge member for panel sealing and installation of seals. Additional, there are two long and narrow areas of chamfer where the two lower tracks 68 of a flap assembly attach to the flap panel 29. These narrow areas of chamfer are long enough to accommodate installation of the attach fittings 88 of the mobile carriage 66. A final chamfered area at the aft end of the midsection of flap panel 29 provides for installation of the connecting member 142 between the ball nut 140 and the flap panel 29. The installation of the lower tracks 68 to the flap panel 29 requires a series of spacers 150. These spacers closely fit between the curved surface of the flap panel 29 and the flanges 124 of the straight lower tracks 68 (see FIGS. 2 and 8). These spacers 150 are square metal plates with variable thickness. Fastening of the tracks 68 through the spacers 150 to the flap panel 29 is by rivets or bolts.

The exterior lower surface of the outer skin 148 of the flap panel 29 curves convexly upward to form a curved forward edge 154. The curved forward edge 154 of the flap panel 29 tangentially contacts the curved forward edge of the fixed leading edge panel 28 so that the flap assembly has a rounded, smooth leading edge when the flap panel 29 is retracted.

As mentioned previously, the actuation mechanism 27 moves the flap panel 29 relative to the fixed leading edge panel 28. This is accomplished as follows. Starting when the flap panel 29 is in the fully retracted position shown in FIGS. 2 and 4, the right angle drive is operated to rotate the screw 137 in a first direction, which causes forward movement of the ball nut 140 along the length of the ball screw. Forward movement of the ball nut 140 pushes the connecting member 142 forward, which in turn pushes the flap panel 29 forward.

As the flap panel 29 is pushed forward, the lower track 68 (see FIG. 2) moves forward along with the flap panel. As the lower track 68 moves forward, the lower track slides along the stationary carriage 70 as shown in FIG. 3. As the lower track 68 slides forward, the attach fitting 88 connected thereto, pulls the mobile carriage 66 forward. This causes the mobile carriage 66 to slide forward along the upper track 64. Since the upper and lower tracks are divergent, the motion of the flap panel 29 translates forwardly and also rotates clockwise (as viewed in FIGS. 2–4) by a few degrees. When the flap panel 29 first begins to deploy, the couple between the two pivots 108 on the mobile carriage 66 and the stationary carriage 70 is very long. Therefore, the initial motion is dominated by translation (Fowler motion) with very little rotation. As the couple between the two carriages 66 and 70 decreases, the rotation of the flap becomes more and more pronounced.

The maximum forward position of the flap panel 29 relative to the fixed leading edge panel 28 is shown in FIG. 3. In this position, the forward edge 154 of the flap panel 29 is forward and below the forward edge 54 of the fixed leading edge panel 28. The right angle drive 136 may be stopped at any time, placing the flap panel 29 in a position intermediate the fully retracted position and the maximum forward position. More particularly, as the right angle drive 136 is operated, the forward edge 154 of the flap panel 29 is moved forward and downward relative to the forward edge 54 of the fixed leading edge panel 28 along a substantially smooth parabolic path.

Several components of the flap assembly 16 serve to limit the maximum forward movement of the flap panel 29 relative to the fixed leading edge panel 28. First, the stop 144 at the end of the screw 137 limits the forward movement of the ball nut 140 as indicated by the phantom position of the nut shown in FIG. 4. Second, further forward movement of the lower track 64 can be prevented by installing a stop in the aft end of the lower track 68 that stops the stationary carriage 70. Third, the forward end of the upper track 64 can be equipped with a stop to prevent the mobile carriage 66 from traveling past the forward end thereof. Like most flaps, this vortex flap will probably have an electrical flap position sensing device that slows the flap motion (snubbing), stops the drive motor and engages a drive brake based on flap position logic.

When it is desired to retract the flap panel 29, the right angle drive 136 is operated to rotate the screw 137 in the reverse direction. This moves the ball nut 140 aft along the screw 137, which acts upon the connecting member 142 to pull the flap panel 29 aft. Consequently, the mobile carriage 66 moves aft along the upper track 64, and the lower track moves aft along the stationary carriage 70.

Figure 5:
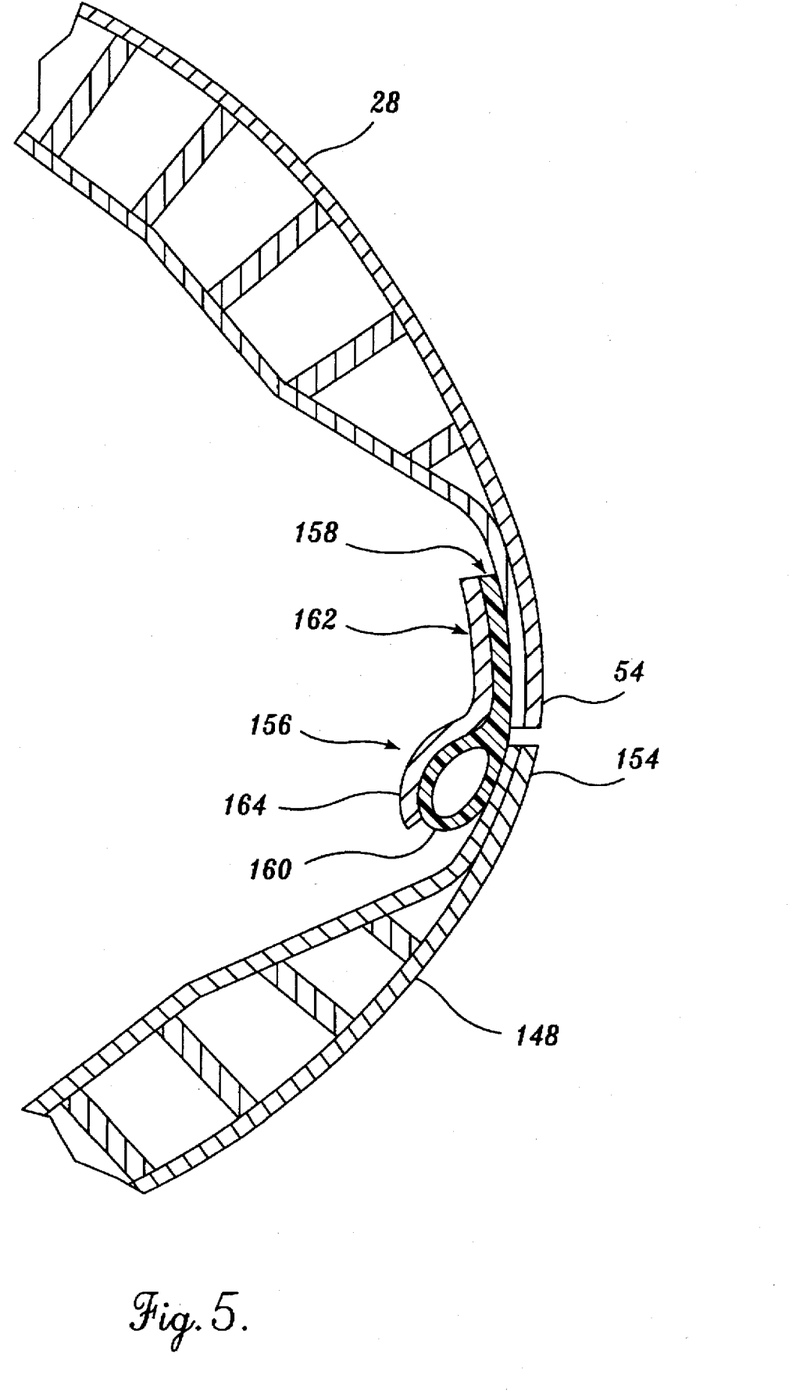
FIG. 5 is an enlarged cross-sectional view of a forward seal shown in FIGS. 2–4.

Referring to FIGS. 2–4, a forward seal 156 runs along the interior forward edge 54 of the fixed leading edge panel 28 to prevent air from flowing through the flap assembly 16 when the flap panel 29 is retracted. An enlarged view of the forward seal 156 is illustrated in FIG. 5. The forward seal 156 includes a layer 158 of a durable flexible material, such as fabric impregnated with silicon rubber, having a hollow, bulbous distal end 160. The layer 158 is attached to the interior forward edge 54 of the fixed leading edge panel 28, with the bulbous end 160 extending downward past the forward edge of the fixed leading edge panel. A retainer 162, preferably formed of a metal alloy, is disposed adjacent the first layer 158, opposite the forward edge 54 of the leading edge panel 26. The retainer 162 includes a generally spoon-shaped distal end 164, which is positioned so that its concave surface cups the bulbous end 160 of the first layer.

When the flap panel 29 is retracted, the forward edge 154 thereof presses against the bulbous end 160 of the forward seal 156, pressing the bulbous end against the retainer 162 and forming a compression seal. Frequently, this is referred to as a bulb seal.

The flexible layer 158 and retainer 162 are connected to the forward edge 54 of the upper fixed leading edge panel 28 by fasteners, and in particular fasteners that penetrate through the flexible layer 158, the retainer 162, and the forward chamfered edge 54 of the fixed leading edge panel 28.

Figure 6:
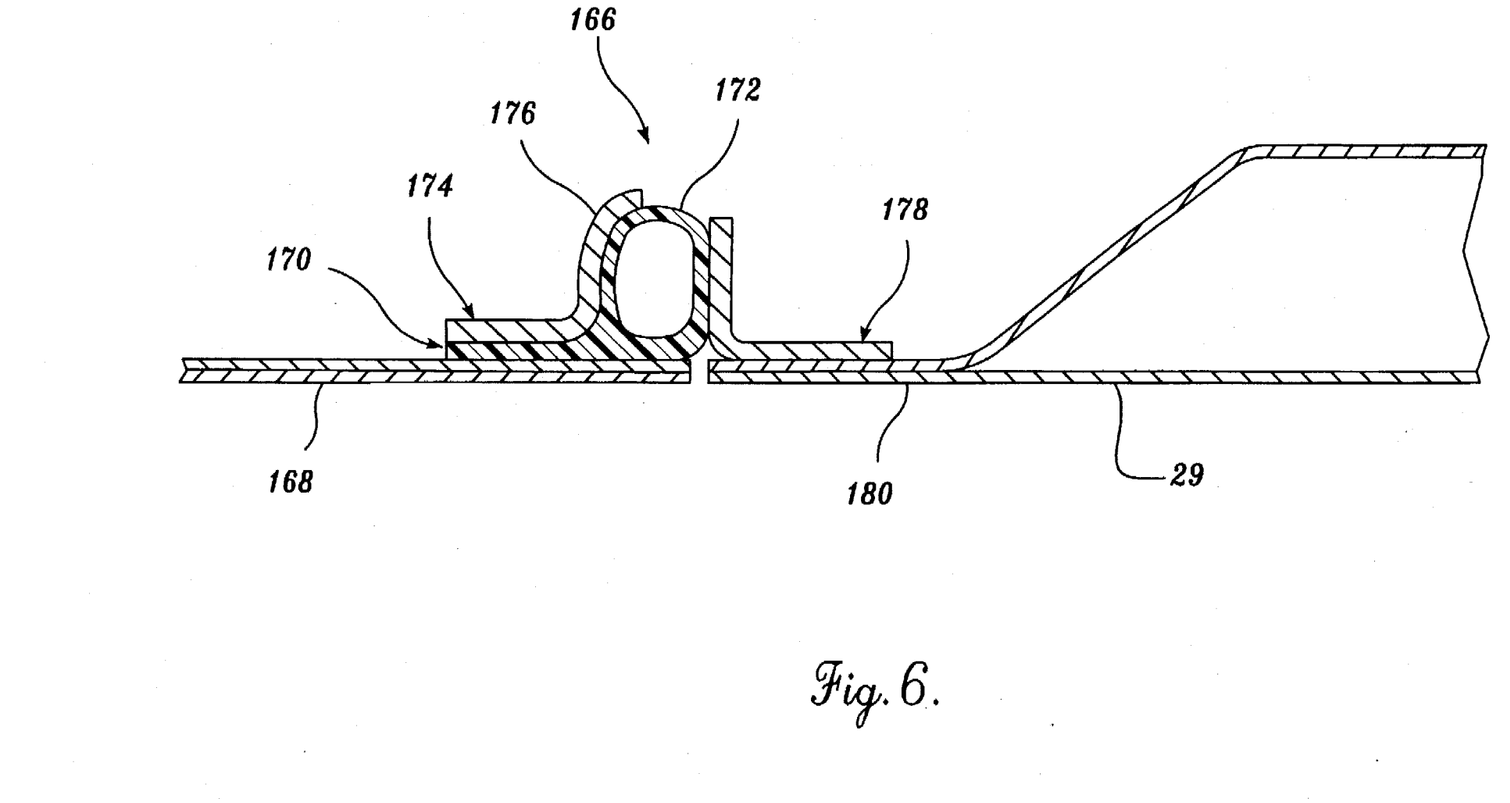
FIG. 6 is an enlarged cross-sectional view of a rear seal shown in FIGS. 2–4.

An aft seal 166 is also provided as shown in FIGS. 2–4. The aft seal 166 connects to a short lower skin panel 168 just forward of the front spar 20. The aft seal 166 runs the length of the flap assembly 16 underneath the ribs 24. An enlarged view of the aft seal 166 is shown in FIG. 6.

The short lower skin panel 168 that carries the aft flap seal 166 is also an access panel to the leading edge cavity in case the flap panel 29 freezes in the retracted position. The short lower skin panel 168 is fastened to the lower forward chord of the front spar 20 and the lower flange 36 of the support ribs 24.

The aft seal 166 is a bulb seal, having a layer 170 of a durable flexible material, such as fabric impregnated with silicon rubber, disposed adjacent the short lower skin panel 168. The flexible layer 170 includes a hollow, bulbous distal end 172 that projects transversely upward, and slightly forward past the distal edge of the short lower skin panel 168. A retainer 174, preferably comprising a metal alloy, is disposed adjacent the flexible layer 170. The retainer includes a generally spoon-shaped section 176, which projects transversely to cup and support the aft side of the bulbous distal end 172 of the flexible layer 170.

The aft seal 166 includes a contact plate 178 running the length of the flap assembly 16 on the flap panel 29. In particular, the contact plate 178 mounts to a chamfered region 180 of the flap panel 29 at a location aft of the lower rail 68. Preferably, the contact plate 178 is formed of a metal alloy into a shape corresponding generally to an upper case letter "L". More particularly, one leg of the "L" is mounted to the chamfered region 180, while the other leg projects transversely upward, having its aft surface in substantial alignment with the distal edge of the chamfered region 180. When the flap panel 29 is substantially retracted, the contact plate 178 on the flap panel presses against the bulbous distal end 172 of the flexible layer 170 on the short lower skin panel 168. Preferably, penetrating fasteners attach the contact plate 178, retainer 174, and flexible layer 170 to the chamfered regions 180 and 168.

Where the flap panels 29 are in their stowed position, a seal (not shown) is provided on the flap side edges between flap panels to prevent leakage and spanwise flow inside the leading edge cavity. These side seals are attached to the chamfered edges of the flap panels 29 and are similar to the aft seals 166.

Referring to FIGS. 2–4, a baffle seal 182 is provided to prevent air flow through the flap assembly 16 when the flap panel 29 is extended. The baffle seal 182 comprises a flexible plate, preferably made of a metal alloy, or a composite material, running the length of the flap assembly 16. The plate is formed into a shape generally corresponding to an uppercase letter "L". The vertical leg of the "L" connects to the forward flange of the ribs 24 as shown in FIGS. 2 and 3 so that this leg extends transversely downward from the fixed upper panel 28 to a location below the ribs. The other leg extends aft as shown in FIG. 4. When the flap assembly 16 fully deploys, the aft extending leg stays in close proximity to the interior of the outer skin 148 of the flap panel 29 to form an aerodynamic seal. Cutouts are provided in the baffle seal 182 to accommodate irregularities, such as the upper track 68 (see FIGS. 2 and 3), and the connecting member 142 (see FIG. 4). Preferably, penetration fasteners connect the baffle seal 182 to the ribs 24.

The foregoing described embodiment of the invention provides several advantages. First, when a leading edge flap panel is extended forward and downward relative to the fixed surface of a wing, the effective chord length and camber of the wing is increased, which results in an increased lift coefficient for a given angle of attack. In the past, such a deployment has triggered an unstable vortex on the flap panel with adverse impacts on airplane control and ride quality. With leading edge flap assemblies formed in accordance with the present invention, such a vortex is stabilized and thus no adverse impact to airplane control or ride quality occurs. Referring to FIGS. 3 and 4, when the flap panel 29 is extended relative to the fixed leading edge panel 28, the upwardly curved forward edge 154 of the flap panel 29 acts as a trigger for flow separation and initiation of a vortex on the upper surface of the vortex flap panel 29. This vortex produces lift. (Such a vortex is illustrated schematically by dashed flow lines in FIG. 4.) The downwardly curved forward edge of the fixed upper panel 28 causes the airflow to reattach to the upper wing surface, which stabilizes the vortex.

Second, as noted previously the flap panel 29 may be deployed to positions that are intermediate a fully retracted position (see FIG. 2), and a fully extended position (see FIG. 3). These intermediate deployed positions make leading edge flap assemblies in accordance with the present invention useful over a wide range of subsonic speeds. In particular, as the flap panel 29 is retracted from the fully extended position, the forward edge 154 of the flap panel retracts and rotates upwardly relative to the forward edge 54 of the upper fixed leading edge panel 28. The effect of this is to produce a smaller vortex, which is useful at higher subsonic speeds when the airplane is flying at a lower angle of attack to improve the lift to drag ratio.

Third, the stable vortex on the leading edge of the wing, produces lift, which creates a nose-up pitching moment. This nose-up pitching moment reduces the down trim requirements on the horizontal tail, resulting in more overall lift (trimmed lift) and better lift to drag ratio.

Fourth, when the flap panel 29 is extended, it is extended so that its forward edge 154 is generally always directed towards the oncoming airflow. This minimizes the actuation force required to deploy a flap formed in accordance with the present invention, as compared to Krueger type flaps that must be rotated into deployment against the oncoming airflow.

Moreover, extension of the flap panel 29 in a direction towards the oncoming airflow in the present invention results in a smoothly changing lift coefficient, and reduced drag relative to prior art proposals. With flaps that are rotated into position, there is usually a temporary abrupt change in lift and drag.

Additionally, the coupling moment between the mobile carriage 66 and the stationary carriage 70 decreases for partial deployment positions of the flap panel 29. Therefore, the load reacting capability of the flap assembly 16 increases for partial deployment positions so that higher flap panel loads (caused by higher speeds) can be reacted without strengthening the structure. In the stowed position, the couple between the carriages is maximized. This means that the flap is held in place very firmly and that the high airloads at supersonic speeds can be reacted with minimum actuation loads and deflections.

Finally, leading edge flap assemblies formed in accordance with the present invention use guide tracks that are straight, and therefore can be inexpensively manufactured. Frequently, flap deployment systems use curved guide tracks or rails, which are difficult and expensive to manufacture.

While a preferred embodiment of the invention has been illustrated and described, it will be appreciated that various changes can be made therein without departing from the spirit and scope of the invention. For example, the roller carriages 66 and 70 could be replaced with slide blocks, which provides surface contact for better wear characteristics. Each flap assembly 16 could be provided with two spaced-apart drive mechanisms 62 to minimize racking. Additionally, a single leading edge panel 26 could extend over several flap panels 29. Also, the tracks 64 and 68 could be altered from channel sections so as to have lateral flanges for rollers to run along the top and bottom of these flanges. Thus, it is to be understood that within the scope of the appended claims the invention can be practiced otherwise than as specifically described herein.

The embodiments of the invention in which an exclusive property or privilege is claimed are defined as follows:

1. A leading edge flap assembly for connection to the forward spar of an airplane wing, the leading edge flap assembly comprising:
   (a) a fixed leading edge panel, having an upper surface curving convexly downward to form a downwardly curved forward edge, and a trailing edge adapted for connection to the forward spar of an airplane wing;
   (b) a flap panel, having a lower surface curving convexly upward to form an upwardly curved forward edge; and
   (c) an actuation mechanism for connecting the flap panel to the fixed leading edge panel and moving the flap panel relative to the fixed leading edge panel between:
      (i) a retracted position, whereat the forward edge of the flap panel lies adjacent to the forward edge of the leading fixed edge panel such that the forward edge of the flap panel is in substantial tangential alignment with the forward edge of the fixed leading edge panel to form a substantially rounded forward wing leading edge; and
      (ii) an extended position, whereat the forward edge of the flap panel lies at a location forward and below the forward edge of the fixed leading edge panel.

2. The leading edge flap assembly of claim 1, including a first internal rib connected to the forward spar of the wing of the airplane for supporting the fixed leading edge panel.

3. The leading edge flap assembly of claim 2, including a second internal rib connected to the forward spar of the wing of the airplane, spaced apart from the first internal rib, for supporting the fixed leading edge panel.

4. The leading edge flap assembly of claim 3, wherein the actuation mechanism includes a first, generally straight guide track connected to the first rib, and a second, generally straight guide track connected to the second rib for guiding movement of the flap panel when the flap panel is moved relative to the fixed leading edge panel.

5. The leading edge flap assembly of claim 4, wherein the actuation mechanism includes a first carriage mounted in the first guide track and attached to the flap panel, and a second carriage mounted in the second guide track and attached to the flap panel such that each carriage travels along its respective guide track when the flap panel is moved relative to the fixed leading edge panel.

6. The leading edge flap assembly of claim 5, wherein each carriage is pivotally mounted to the flap panel.

7. The leading edge flap assembly of claim 3, wherein the actuation mechanism includes a generally straight first guide track mounted to the flap panel for guiding movement of the flap panel when the flap panel is moved relative to the fixed leading edge panel.

8. The leading edge flap assembly of claim 7, wherein the actuation mechanism includes a generally straight second track mounted to the flap panel for guiding movement of the flap panel when the flap panel is moved relative to the fixed leading edge panel.

9. The leading edge flap assembly of claim 8, wherein the actuation mechanism includes a first carriage mounted in the first guide track, and a second carriage mounted in the second guide track, such that the carriages travel along the guide tracks when the flap panel is moved relative to the upper fixed leading edge panel.

10. The leading edge flap assembly of claim 9, wherein each of the two carriages is pivotally mounted to the forward lower end of a support rib.

11. The leading edge flap assembly of claim 3, further comprising a first seal mechanism substantially sealing the forward edge of the fixed leading edge panel to the forward edge of the flap panel when the flap panel is in the retracted position.

12. The leading edge flap assembly of claim 3, wherein the drive mechanism includes:

(a) an angle drive gear box mounted to the front spar of the wing;
   (b) a ball screw mechanism extending forward from the gear box, having a screw that rotates when the angle drive gear box is actuated, the ball screw mechanism including a ball nut threadably mounted on the screw; and
   (c) a coupling mechanism for coupling the ball nut of the drive mechanism to the flap panel.

13. The leading edge flap assembly of claim 3 further comprising a seal mechanism substantially sealing the aft end of the flap panel to the forward end of a lower fixed panel when the flap panel is in the retracted position.

14. The leading edge flap assembly of claim 3, wherein the leading edge flap assembly is for use with a plurality of leading edge flaps on an airplane wing, further comprising a seal mechanism for substantially sealing the flap panel to another leading edge flap assembly.

15. The leading edge flap assembly of claim 1, further comprising a baffle plate extending downward from the leading edge panel, the baffle plate having a distal end extending to a position proximate the flap panel when the flap panel is in the extended position.

* * * * *